March 6, 1956　　A. H. BENNETT ET AL　　2,737,084
OPTICAL SYSTEMS FOR OBTAINING CONTRAST EFFECTS
Filed Feb. 4, 1950　　　　　　　　　　　　　　3 Sheets-Sheet 2

INVENTORS
ALVA H. BENNETT
ARTHUR J. KAVANAGH
BY
ATTORNEYS

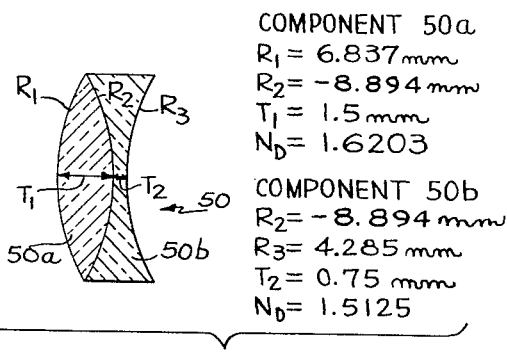

Fig. 5

COMPONENT 50a
$R_1 = 6.837$ mm
$R_2 = -8.894$ mm
$T_1 = 1.5$ mm
$N_D = 1.6203$

COMPONENT 50b
$R_2 = -8.894$ mm
$R_3 = 4.285$ mm
$T_2 = 0.75$ mm
$N_D = 1.5125$

Fig. 6

LATERAL ABERATION
PHASE DIFFERENCE

Y = LATERAL ABERRATION IN MILLIMETERS.
V = PHASE DIFFERENCE IN FRACTIONS OF A WAVE LENGTH.
$\alpha$ = ANGLE OF INCLINATION OF RAY IN IMAGE SPACE.

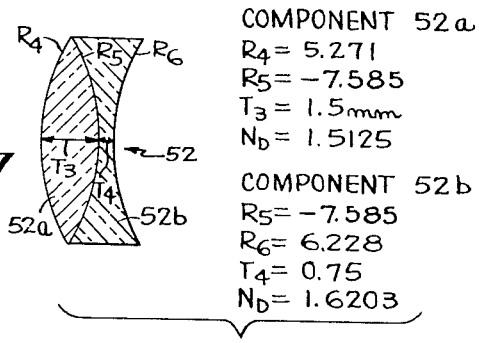

Fig. 7

COMPONENT 52a
$R_4 = 5.271$
$R_5 = -7.585$
$T_3 = 1.5$ mm
$N_D = 1.5125$

COMPONENT 52b
$R_5 = -7.585$
$R_6 = 6.228$
$T_4 = 0.75$
$N_D = 1.6203$

Fig. 8

PHASE DIFFERENCE
LATERAL ABERRATION

Y = LATERAL ABERRATION IN MILLIMETERS.
V = PHASE DIFFERENCE IN FRACTIONS OF A WAVE LENGTH.
$\alpha$ = ANGLE OF INCLINATION OF RAY IN IMAGE SPACE.

INVENTORS
ALVA H. BENNETT
ARTHUR J. KAVANAGH
BY
ATTORNEYS

United States Patent Office 2,737,084
Patented Mar. 6, 1956

2,737,084

OPTICAL SYSTEMS FOR OBTAINING CONTRAST EFFECTS

Alva H. Bennett, New Canaan, and Arthur J. Kavanagh, Darien, Conn., assignors to American Optical Company, Southbridge, Mass., a voluntary association of Massachusetts Application February 4, 1950, Serial No. 142,508

1 Claim. (Cl. 88—39)

This invention relates to modification of light rays within an optical system for the purpose of obtaining improved contrast effects in an image of an object under observation. More particularly, the invention relates to optical systems wherein controlled amounts of spherical aberration are provided for varying the phase of portions of a wave front and wherein various phase contrast effects may be obtained through interchangeable elements or through a continuously variable element or elements.

An object or specimen of a type suitable for consideration herein may constitute a plurality of particles and surrounding regions having, for example, small differences of optical path (thickness times refractive index) and/or small transmission differences. A single particle and its surround may appropriately be considered relative to the light rays employed.

In known methods of phase contrast microscopy, it is customary to employ a diaphragm adjacent the entrance pupil of an optical system for admitting light of a given transverse contour to a condenser. The latter directs the light upon an object or specimen and an objective and eyepiece are employed in a conventional manner. At the exit pupil of the condenser and objective (back focal plane of the objective) a special light-modifying element is positioned for altering a phase and/or amplitude difference existing between deviated (diffracted) and undeviated light rays emanating from the object. Some of the light rays incident the particle are deviated thereby as, for example, due to discontinuity of optical path at the edges of the particle and may, for example, be relatively retarded in phase and consist of higher orders of spectra. Other light rays incident the particle emerge therefrom as undeviated rays and constitute the zero order. Light passing through the surround may be considered as substantially undeviated, for purposes of illustration. The undeviated light rays emerging from the particle and surround are spread throughout an image plane such as the field of an eyepiece. The deviated rays or spectra are brought to a focus on a part of the eyepiece field and are combined with overlapping portions of the undeviated rays to form a geometrical image of the particle. During their transmittal by the aforesaid light-modifying element, at least one of the deviated and undeviated bundles of rays is altered in phase and/or amplitude, according to the contrast requirements, so that reinforcing or destructive interference occurs therebetween to provide bright or dark contract of the particle with respect to the surround.

The present invention involves novel means readily incorporated with an optical system for modifying the aforesaid phase and amplitude differences and provides modification of said differences, either to a predetermined degree or in a continuous manner throughout a predetermined range. Moreover, the invention, basically, avoids the need of employing the usual "diffraction plate" at the back focal plane of the objective. Through devices of the present invention, it is possible to eliminate entirely the requirement of a thin layer of dielectric material to modify the phase of either the deviated or undeviated light rays and, instead, to incorporate with lens components of a system means for thus altering phase of the light rays. This result may be obtained by employing specially formed objective lenses for the purpose or by annexing to the objective one or more lenses with spherical surfaces and having special characteristics.

While a diaphragm having a light aperture of predetermined dimensions and contour is shown herein as a suitable means for admitting light, other means may be employed for serving a generally similar purpose. The term "light," as used herein, is not to be considered as necessarily restricted to those wave lengths of radiant energy to which the human eye is sensitive but may comprise other forms of radiant energy, including those in the invisible portions of the spectrum. Accordingly, any suitable primary or secondary light source may be utilized in the optical systems of the invention. Diaphragms of the type employed herein provide a secondary light source and are to be construed as falling within the meaning of the term light source. Other light sources which might suitably be positioned at the location of the diaphragm include an incandescent filament, a fluorescent lamp, a reflecting surface, the image of a lamp filament or of a light aperture, or the image of some other source of radiant energy.

An object of the invention is to provide an optical system through which improved contrast effects are obtained in an image of an object or specimen undergoing study.

Another object of the invention is to provide such an optical system which is adapted to a microscope.

A further object of the invention is to provide an optical system of the character described wherein alteration of contrast in an image is obtained in a gradual and progressive manner.

Still another object of the invention is to provide an improved phase contrast device for incorporation with an optical system.

A still further object of the invention is to provide such a device which is capable of modifying the phase and amplitude relation of light rays emanating from an object.

Another object of the invention is to provide a device or system of the character described wherein controlled amounts of spherical aberration are produced by one or more elements of an objective system for altering the phase difference between deviated and undeviated light rays.

A further object of the invention is to provide phase-modifying devices of the character described having co-acting amplitude modifying components.

These and other objects of the invention will be apparent from the following description taken in connection with the accompanying drawings, wherein like reference characters refer to like parts throughout the several views of which:

Fig. 5 is a side view of a lens element of the invention;

Fig. 6 is a graph relating to the lens of Fig. 5;

Fig. 7 is a side view of another lens element of the invention;

Fig. 8 is a graph relating to the lens of Fig. 7;

Figure 1:
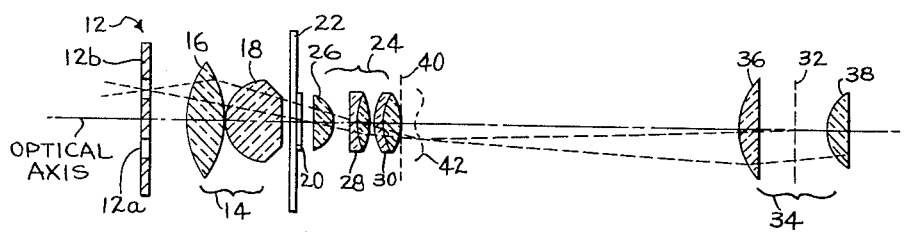
Figure 1 is a diagrammatic view of an optical system constituting one embodiment of the invention.
Figure 10:
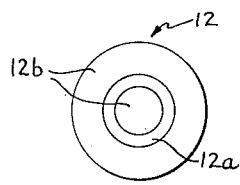
Fig. 10 is a front detail view of a diaphragm employed in an optical system of the invention.

The optical system shown in Fig. 1 is one which may suitably be employed in a microscope. A diaphragm 12 is positioned adjacent the entrance pupil of the system for admitting light from a source (not shown). The diaphragm provides a secondary light source at the entrance pupil and for purposes of the method may, thus, of itself be considered as the source of light. Diaphragm 12 has a light aperture 12a formed therein and opaque portions 12b, the aperture suitably being in the shape of an annulus which provides light of an annular cross-section. Diaphragm 12 is further shown in Fig. 10. While the annular aperture is of a preferred type, it is to be understood that other shapes and sizes of apertures may be employed, as is well known in the phase contrast art. A condenser 14, comprising elements 16 and 18, is provided for directing light rays from the diaphragm upon an object or specimen 20 which is mounted upon a transparent plate or slide 22. An objective system 24, comprising components 26, 28 and 30 is positioned adjacent the specimen. It is to be understood that the objective operates at its proper conjugates in forming an image of the specimen at an image plane 32 of an eyepiece 34 consisting of elements 36 and 38. The combined optical properties of the condenser, slide, specimen, specimen coverglass (not shown) and objective are such as to form an image of annular light aperture 12a at a plane which intersects the optical axis adjacent the second principal focal point of the objective. Otherwise stated, this plane 40 would be adjacent the back focal plane or exit pupil of the combined system of the condenser and objective and may suitably be located as shown, contiguous a surface of objective component 30.

In a conventional optical system, having a diaphragm condenser and objective, a wave front emerging from the objective would preferably have a shape which would resemble a portion of a sphere, having its center of curvature at an image point. In a conventional phase contrast system, the shape of the wave front is changed from a spherical form, portions thereof being retarded with respect to other portions, by a so-called diffraction plate, having a thin layer of a dielectric material formed on its surface. Such a diffraction plate is positioned at the aforesaid back focal plane or exit pupil. The dielectric layer may, for example, be deposited upon an annular zonal portion of the plate, conjugate to the annular light aperture of the diaphragm, and have properties for retarding undeviated light rays emanating from a specimen by a quarter of a wave length, such a plate being termed a "plus" type. Or, a zonal portion of the plate, complementary to said annular portion, may have such a layer formed thereon for retarding the deviated light rays and, accordingly, be of a so-called "minus" type.

The present invention principally departs from the above-described constructions in that the diffraction plate may be dispensed with entirely. It is well known that when image-forming bundles of rays emerging from an objective produce spherical aberration, the wave front is not spherical but that portions are advanced or retarded with respect to the ideal spherical form. Such a wave front is indicated by the nonspherical curved line at 42 of Fig. 1 and is produced by the special characteristics of objective 24. Light rays of the ray bundle do not all pass through an image point, at the intersection of image plane 32 and the optical axis, but intersect image plane 32 at various transverse distances from said image point.

Figure 2:
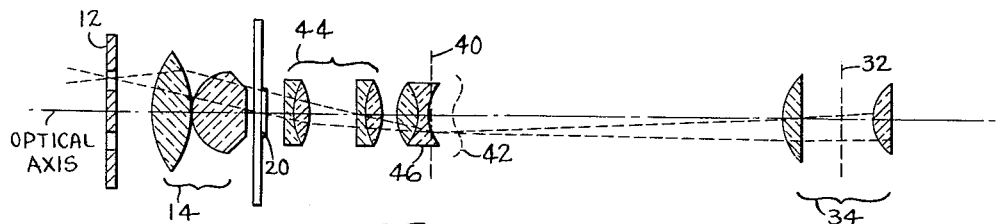
Fig. 2 is a diagrammatic view of an optical system illustrating another embodiment of the invention.

In Fig. 2, an optical system is shown wherein an auxiliary lens is positioned adjacent the objective for producing a controlled spherical aberration. The system includes elements similar to those of Fig. 1 such as a diaphragm 12, a condenser 14 which directs light upon an object 20 and an eyepiece 34 having a focal plane 32. An objective 44 has an auxiliary lens 46 coacting therewith for producing a controlled spherical aberration of light rays traversing the system. Lens 46 may, alternatively, be annexed to the objective. Curved line 42 indicates a non-spherical wave front emanating from lens 46. The back focal plane of the objective is located at line 40.

Figure 3:
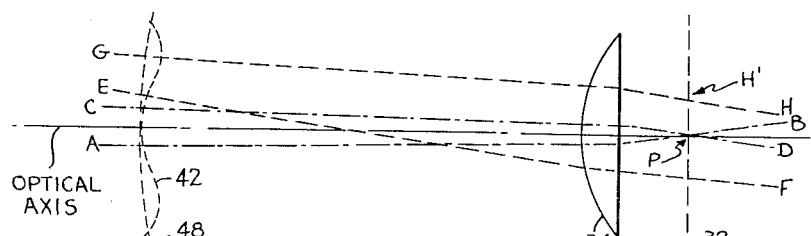
Fig. 3 is a diagrammatic view illustrating the directions of light rays which traverse the optical systems of Figs. 1 and 2.

In Fig. 3, which includes the wave fronts and image planes of Figs. 1 and 2, the relation of light rays A—B, C—D, E—F, and G—H to a nonspherical wave front 42 is shown. Fig. 3 also illustrates the departure of nonspherical wave front 42 from an ideal spherical shape. Accordingly, the position, only, of a spherical wave front is to be understood as represented by curved line 48 and not the presence of such a wave front. The image point P is at the center of curvature both of curved line 48 and of the central superposed spherical portion of wave front 42. Thus, the light rays A—B and C—D represent rays identified both with central portions of wave front 42 and spherical line 48. It will be noted that because of spherical aberration light rays E—F and G—H do not pass through image point P but intersect the image plane 32 at various distances therefrom. Fig. 3 is merely illustrative and much larger aberrations are shown than would exist in practice. The wave front is perpendicular to a light ray at each point of intersection and thus the nonspherical wave front derives its form, portions thereof being advanced or retarded with respect to the spherical form. Considering light rays E—F and G—H which intersect image plane 32 at various distances from image point P, the distance by which each is displaced from image point P is customarily called the lateral aberration of the ray. For example, the distance or height P—H' along image plane 32 represents the lateral aberration of the ray G—H. It is well known that the departure of the wave front from the spherical shape can be expressed in terms of the lateral aberrations of the rays at the image plane.

Figure 4:
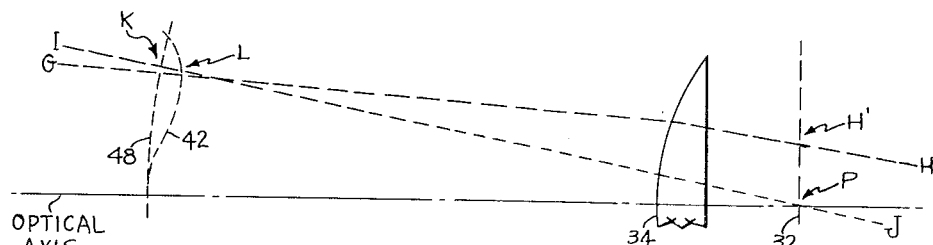
Fig. 4 is a diagrammatic view showing the relation of certain light rays of Fig. 3.

In Fig. 4, which further illustrates a portion of Fig. 3 and shows aberrations which are exaggerated for clarity in the drawing, the distance between intersection points K and L equals the departure of nonspherical wave front 42 from the spherical contour 48, measured along the line I—J. Accordingly, wave front 42 is advanced with respect to the spherical wave front form at L. Let $\alpha$ be the angle of inclination of a light ray producing spherical aberration to the optical axis, the sign convention being the ordinary one of analytical geometry. Let $y$ equal the lateral aberration of the ray. For the particular ray G—H, passing through intersection point L, let $$\alpha = \bar{\alpha}$$

Then $$KL = \int_0^{\sin \bar{\alpha}} y \, d(\sin \alpha)$$

The departure or aberration KL can be expressed as a phase difference by dividing it by the wave length of the light of the bundle. Thus, the phase difference at L is $$\frac{KL}{\lambda} = \frac{1}{\lambda} \int_0^{\sin \bar{\alpha}} y \, d(\sin \alpha)$$

From the foregoing, it is evident that phase differences of a desired magnitude may be obtained between a nonspherical and spherical wave front by employing an objective having predetermined aberration characteristics, by providing a special lens or lenses adjacent the objective having such characteristics, or by a combination of the above procedures.

Figs. 5 and 7 show examples of lenses having aberration characteristics for producing a maximum phase advance or retardation of approximately $\frac{1}{4}\lambda$. These lenses are suitable for use with objective lenses which are substantially devoid of aberration characteristics and may be located in an optical system similarly to lens 46 of Fig. 2 or annexed to an objective component. In the latter instance, they may be considered as a part of the objective system. In Fig. 5, a doublet lens 50, having components 50a and 50b suitable for producing phase differences of a plus type, is shown, said lens being employed for retarding undeviated portions of the light rays emanating from an object to a maximum of ¼λ. The graph of Fig. 6 relates thereto and shows the lateral aberration in millimeters expressed as a function of sin α. The curve of phase differences, obtained by integration according to the formula hereinbefore given, is shown. The spherical aberration characteristics of lens 50 are such that an annular portion of the wave front, conjugate to annular light aperture 12a, is retarded by one-quarter of a wave length with respect to outer and central complementary portions of the wave front, which are located to each side of said annular portion. Reference may again be had to the diaphragm shown in Fig. 10 for an understanding of the cross-sectional form of the light bundles, light aperture 12a being similar in form to the undeviated bundles of rays providing conjugate portions of the wave front and portions 12b being similar in contour to the deviated bundles providing complementary portions of the wave front.

Fig. 7 illustrates a lens 52, having components 52a and 52b, which may also be located at the position of lens 46 of Fig. 2. Lens 52 provides phase differences of a minus type, namely, a one-quarter of a wave length maximum retardation of the deviated bundles of rays relative to the undeviated bundles. Accordingly, the wave front would have an annular conjugate portion advanced with respect to complementary outer and central portions. Fig. 8 shows a graph pertaining to lens 50 and again presents lateral aberration in millimeters expressed as a function of sin α and the curve of phase differences obtained by integration in accordance with the formula previously given. Where auxiliary lenses of the type shown in Figs. 5 and 7 are employed, the curves shown in Figs. 6 and 8 assume a distance from the first surface of the lens to the point where the image would be formed, if the auxiliary lens were not present, namely, at the intersection of plane 32 with the optical axis in Figs. 1 and 2, of 170 mm. While retardations of one-quarter wave length are mentioned herein, it is to be understood that these values are illustrative and that other retardation values are possible.

Figure 9:
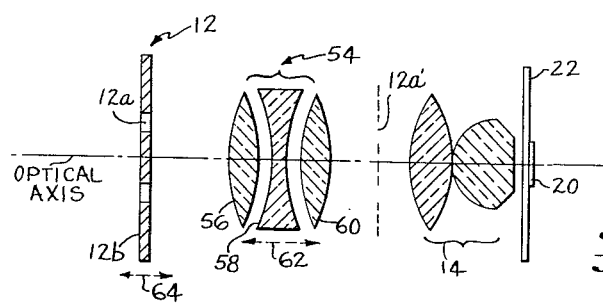
Fig. 9 is a diagrammatic view of a device suitable for inclusion in an optical system of the invention for producing variable magnification of an image.

From the foregoing description, it will be apparent that controlled aberration means comprising interchangeable objectives, interchangeable auxiliary lenses or interchangeable assemblies including an objective and an auxiliary lens may be employed, each of said means having a predetermined aberration characteristic for obtaining various alterations of phase differences existing between the deviated and undeviated light rays. A continuously variable method of altering said differences may also be obtained by providing means for moving or effectively moving the annular bundle of undeviated light rays formed at plane 40 of Figs. 1 and 2 radially with respect to the optical axis, thus selectively utilizing different annular portions of the lens element or elements having predetermined aberration characteristics and, accordingly, providing rays of various aberration and phase characteristics. Said means for radially varying the position of an annulus of light rays make possible a gradual or progressive variation of contrast effects in an image of the object. Fig. 9 illustrates a device for providing radial movement of the light rays which may be included in the optical systems of Figs. 1 and 2. A lens system 54, comprising elements 56, 58 and 60 is mounted between diaphragm 12 and condenser 14 so as to be adjustable, as a unit, longitudinally of the optical axis, as indicated by double-headed arrow 62. Diaphragm 12 is also mounted for longitudinal movement as indicated by double-headed arrow 64. Lens system 62 forms a real image of light aperture 12a at 12a'. Condenser 14 and objective 24 (Fig. 1) or 44 (Fig. 2) form a real image of the image 12a' at plane 40. Variable magnification and, accordingly, radial variation of the image at 12a' is obtained by varying the spacing between diaphragm 12 and lens system 54 and between said elements and the plane of image 12a'.

Figure 11:
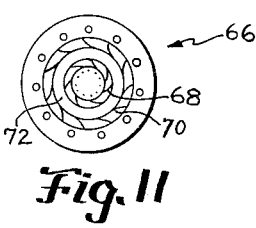
Fig. 11 is a front detail view of a modification of the diaphragm of Fig. 10.

An alternate device providing a radially variable annular image at plane 40 is shown in Fig. 11 in the form of an adjustable composite iris diaphragm 66 having coacting leaves 68 and 70 for radially expanding or contracting an annular light aperture 72. Diaphragm 66 may be located at the position of diaphragm 12 in Figs. 1 and 2 and may be adjusted for forming conjugate portions of the light bundle which have various phase values accordnig to those portions of the lens elements providing spherical aberration through which said light portions pass. In effect, the devices of Figs. 9 and 11 utilize any of a large number of annular portions of the emergent nonspherical wave front and thus produce any of a variety of possible phase relations between the chosen annular portion and other portions of the wave front.

In conventional phase contrast methods additional means are frequently employed to control the relative amplitudes of portions of the wave front. Such means may also be employed in the present invention to coact with phase-modifying means, hereinbefore described, for further improving or varying contrast effects. For example, an annular conjugate portion of the surface of lens component 30, lying substantially in image plane 40, may have a light-absorbing substance such as a thin metallic layer deposited thereon or, the complementary portion of the lens surface may have such a layer formed thereon. A similar amplitude modifying layer may be formed on lens 46 (Fig. 2) for varying the amplitude ratio between deviated and undeviated light rays. A device for gradually or progressively varying the amplitude relation between deviated and undeviated light rays may also be included in an optical system incorporating phase-modifying means of a type described herein. Such a device may, for example, be in the form of a tiltable plate or a plurality of plates intersecting the optical axis adjacent plane 40 (Figs. 1 and 2) or at some other plane as, for example, at a plane established forwardly in the system by an auxiliary lens whereat an image of the image at plane 40 is formed. A tiltable plate of the type contemplated would have zonal portions of predeterminedly different absorption characteristics arranged for selectively intercepting deviated and undeviated light rays and for differentially absorbing the same. When such a plate or a zonal portion thereof, is tilted, the relative absorptivity of the portions is altered. Another method contemplates a device for differentially altering the thickness of a contained light-absorptive fluid in conjugate and complementary portions thereof. An expansible fluid holding chamber having transparent walls intersecting the optical axis could be employed, at least one of the walls differing in thickness in conjugate and complementary zonal portions. Variation of the amplitude relation between deviated and undeviated light rays would be obtained by expanding or contracting the chamber to modify the thickness of the fluid.

It will be apparent that other modifications of the devices and optical systems, above-described, may be made in accordance with the general principles exemplified herein. Accordingly, such examples as have been presented are to be regarded as illustrative and the invention may be otherwise embodied and practiced within the scope of the following claim.

We claim:

An optical instrument for providing uninterrupted progressively variable contrast effects in an image of an object of relatively low contrast when positioned substantially at a predetermined object plane of said instrument, said optical instrument comprising light source means providing a light source of variable size and annular contour disposed transversely of an optical axis of said instrument and at an axial location forwardly of said object plane, light condensing means optically aligned with said light source means and positioned upon said optical axis so as to direct light received from said light source of annular contour toward said object plane for illuminating an object when positioned substantially at said object plane, an image-forming optical system optically aligned with said light condensing means and said light source means and positioned on said optical axis so as to transmit both deviated and undeviated light rays coming from the illuminated object at said object plane, said image-forming optical system being so disposed relative to said object plane as to focus said deviated light rays transmitted thereby substantially at an image plane conjugate to said object plane, said axial location of said light source of annular contour being substantially at the entrance pupil of said light condensing means and said image-forming optical system combined, said condensing means and said image-forming means combined focusing the undeviated light rays transmitted thereby substantially at the exit pupil thereof, said image-forming optical system comprising a plurality of optical components of predetermined optical properties and in predetermined fixed axial relation to each other, and providing a non-spherical wave front to the deviated light rays transmitted thereby which has controlled amounts of spherical aberration providing phase differences varying between zero and substantially one-fourth wavelength at different laterally displaced locations of said wave front when passing said exit pupil, and readily operable means for adjusting said light source means for varying the size of said light source of annular contour at said entrance pupil to thereby vary the size of the image thereof at said exit pupil, and correspondingly vary the location of the undeviated light rays passing said exit pupil laterally relative to said non-spherical wave front of said deviated light rays passing said exit pupil, whereby an overlapping of said deviated and undeviated light rays traveling toward said conjugate image plane will provide through optical interference during adjustment of said operable means gradual and uninterrupted progressively variable contrast effects in the image of said object at said conjugate image plane.

References Cited in the file of this patent

UNITED STATES PATENTS

| | | |
|---|---|---|
| 198,914 | Gundlach | Jan. 1, 1878 |
| 1,556,982 | Weidert | Oct. 13, 1925 |
| 2,427,689 | Osterberg et al. | Sept. 23, 1947 |

FOREIGN PATENTS

| | | |
|---|---|---|
| 10,879 | Great Britain | of 1907 |
| 620,796 | Great Britain | Mar. 30, 1949 |

OTHER REFERENCES

Martin: "Phase Contrast Methods in Microscopy," article in Nature, pp. 827–830, vol. 159, June 21, 1947, published by MacMillan Co., Ltd., London.